United States Patent
Bontjes

(10) Patent No.: US 12,001,664 B2
(45) Date of Patent: Jun. 4, 2024

(54) USER INTERFACE FOR ADJUSTING COMPONENT PROPORTIONS

(71) Applicant: BUSHEL, INC., Fargo, ND (US)

(72) Inventor: Jed Bontjes, Fargo, ND (US)

(73) Assignee: Bushel, Inc., Fargo, ND (US)

( * ) Notice: Subject to any disclaimer, the term of this patent is extended or adjusted under 35 U.S.C. 154(b) by 29 days.

(21) Appl. No.: 17/730,141

(22) Filed: Apr. 26, 2022

(65) Prior Publication Data

US 2022/0342536 A1 Oct. 27, 2022

Related U.S. Application Data

(60) Provisional application No. 63/180,014, filed on Apr. 26, 2021.

(51) Int. Cl.
*A01F 25/14* (2006.01)
*G06F 3/0482* (2013.01)
(Continued)

(52) U.S. Cl.
CPC ........ *G06F 3/04847* (2013.01); *G06F 3/0482* (2013.01); *A01F 25/14* (2013.01); *G06F 3/04845* (2013.01)

(58) Field of Classification Search
CPC .... A01F 25/14; G06F 3/04847; G06F 3/0482; G06F 3/04845
See application file for complete search history.

(56) References Cited

U.S. PATENT DOCUMENTS

| 7,580,932 B2 | 8/2009 | Plastina et al. | |
| 8,360,279 B1 * | 1/2013 | Giles | B01F 33/846 |
| | | | 222/145.6 |

(Continued)

FOREIGN PATENT DOCUMENTS

| AU | 2013222012 A1 * | 3/2014 | ............ G06Q 30/02 |
| CA | 2666085 A1 * | 1/2008 | ............ A23K 10/30 |

(Continued)

OTHER PUBLICATIONS

User Experience Stack Exchange, "Control for adjusting ratio between quantities", published Aug. 11, 2020 at https://ux.stackexchange.com/questions/134272/control-for-adjusting-ratio-between-quantities, retrieved Dec. 4, 2023. (Year: 2020).*

(Continued)

*Primary Examiner* — Shourjo Dasgupta
(74) *Attorney, Agent, or Firm* — Danielson Legal LLC

(57) ABSTRACT

A method for adjusting the proportions of components in a total is described. The method comprises providing a computer processor configured to present, using a user interface, a plurality of components for selection. Further, the method comprises providing the computer processor to receive a selection of the presented plurality of components. Furthermore, the method comprises providing the computer processor to present, using the user interface, a linear arrangement of the selected plurality of components, each pair of adjacent components being separated by a selectable boundary. Additionally, the method comprises providing the computer processor configured to receive a selection of a selectable boundary. Moreover, the method comprises providing the computer processor to adjust, in response to the selection of the selectable border, the relative proportion of the components.

17 Claims, 7 Drawing Sheets

(51) Int. Cl.
*G06F 3/04845* (2022.01)
*G06F 3/04847* (2022.01)

(56) References Cited

U.S. PATENT DOCUMENTS

| | | | |
|---|---|---|---|
| 10,068,273 B2 | 9/2018 | Frehn et al. | |
| 10,839,438 B2 | 11/2020 | Frehn et al. | |
| 11,195,218 B2 | 12/2021 | McCoy | |
| 11,312,607 B2* | 4/2022 | Karibandi | G06F 3/04817 |
| 2009/0069932 A1* | 3/2009 | Rudick | B67D 1/0021 |
| | | | 700/239 |
| 2013/0104071 A1* | 4/2013 | Boutoussov | G16H 40/63 |
| | | | 715/781 |
| 2015/0046877 A1* | 2/2015 | Cuppari | G06F 3/04845 |
| | | | 715/834 |
| 2017/0134872 A1* | 5/2017 | Silva | G06F 3/04886 |
| 2017/0189870 A1* | 7/2017 | Saranow | B01F 35/2207 |
| 2017/0316488 A1 | 11/2017 | Kremen et al. | |
| 2018/0107372 A1* | 4/2018 | Van Damme | G06F 3/04883 |
| 2019/0301990 A1* | 10/2019 | Kauffman | G01N 11/14 |
| 2019/0351381 A1* | 11/2019 | Saranow | B01F 35/2117 |

FOREIGN PATENT DOCUMENTS

| | | | | |
|---|---|---|---|---|
| CA | 2743432 A1 | * | 6/2010 | ............. G06F 1/206 |
| CA | 2977702 A1 | | 3/2018 | |
| CA | 2993310 A1 | * | 3/2018 | ......... G06F 11/3006 |
| CN | 105883336 A | * | 8/2016 | |
| CN | 209811424 U | * | 12/2019 | |
| CN | 111273993 B | * | 8/2023 | ......... G06F 3/04817 |
| EP | 3336674 B1 | * | 6/2020 | ......... G06F 3/04855 |
| JP | H0788352 A | * | 4/1995 | |
| JP | 2006136724 A | * | 6/2006 | ........... G06T 3/0068 |
| KR | 2000075806 A | * | 12/2000 | ......... G06F 3/04847 |
| KR | 101491000 B1 | * | 2/2015 | |

OTHER PUBLICATIONS

Simdi Jinkins, "Let's Make a Multi-Thumb Slider That Calculates the Width Between Thumbs", published on Jun. 23, 2020 at https://css-tricks/lets-make-a-multi-thumb-slider-that-calculates-the-width-between-thumbs, retrieved Jan. 30, 2024. (Year: 2020).*

* cited by examiner

USER INTERFACE FOR ADJUSTING COMPONENT PROPORTIONS

CROSS REFERENCE TO RELATED APPLICATIONS

The present application claims the benefit of and priority to U.S. provisional application No. 63/180,014, filed on Apr. 26, 2021, the content of which is hereby incorporated by reference as if set forth in its entirety herein.

TECHNICAL FIELD

The present invention generally relates to user interfaces, and more particularly relates to systems and methods for adjusting proportions of components in a mixture using a user interface.

BACKGROUND

During harvest, as grain is removed from a field, it may be delivered directly to an elevator, plant, mill, or other point of sale to fulfill a contract; or alternatively, it may be delivered to a grain bin owned by the farmer. Grain bins are used for speed and efficiency, price and/or quality reasons. In particular, speed of truck cycling from pick up to drop off location is important. During harvest, elevators are especially busy and waiting in lines can impede a farmer's progress by holding up trucks. To reduce this bottleneck, grain bins owned by the farmer may be used for intermediary holding instead of delivering directly. Having a bin also increases efficiency by allowing farmers to empty trucks after hours. From a price standpoint, prices are most deflated during harvest, so a farmer may choose to hold grain in a bin and contract for delivery in the spring when a higher return is available. Finally, a farmer may choose to dry and store, or store to dry his own grain if moisture, a quality docking factor, is too high. If the farmer chooses to dry his own grain it may reduce fees encountered at the point of sale.

As a result of variations in grain bin and field sizes, grain may be commingled within the same bin to maximize utilization. If grain is commingled, a challenge exists in keeping track of which field(s) the grain in a bin came from. It is of value to the farmer to know and record this for traceability incentives and for tracking field level performance and profitability.

Previously known methods of bin management include pre-planning, truck based incremental tick marking, or not tracking at all. A farmer may pre-plan that all non-GMO soybeans be placed into one specific bin(s) and not track which field they came from. Otherwise, to track which field the grain comes from, the farmer may use a variety of manual methods. One such method includes placing a strip of duct tape on a bin, writing a field name on the duct tape, and adding a tick mark for each truck that delivers from that specific field. A tally can then be made to approximate the amount of grain stored in the bin from each field. This data can then be manually entered into software programs such as farm management software.

As traceability and sustainability incentives mature, proving which field grain came from and what practices were used becomes vitally important. It is the farmers responsibility to track and record this information as accurately as possible. A need therefore exists for tracking the ratios of grain mixtures and assigning the ratios to tickets representing proof of delivery.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments of the present invention relate to a method for adjusting the proportions of components in a total. The method includes providing a computer processor configured to present, using a user interface, a plurality of components for selection; receive a selection of the presented plurality of components; present, using the user interface, a linear arrangement of the selected plurality of components, at least one pair of adjacent components being separated by a selectable boundary; receive a selection of the selectable boundary; and adjust, in response to the selection of the selectable boundary, the relative proportion of the plurality of components.

In some embodiments the computer processor is further configured to present, using the user interface, the percentage value of each of the plurality of components in proximity to each component.

In some embodiments the plurality of components sum to one hundred percent.

In some embodiments the plurality of components sum to a total value.

In some embodiments the method further includes generating a mixture of physical elements reflecting the relative proportion of the plurality of components. Each physical element may be a food item and the apparatus may be a food item dispenser.

In some embodiments the computer processor is further configured to receive the plurality of components for presentation. The received plurality of components may include a label for each component.

In some embodiments the user interface is part of a mobile device.

In some embodiments the plurality of components are presented in a vertical orientation.

In another aspect, embodiments of the present invention relate to a computer system for adjusting the proportions of components in a total. The system includes a memory configured to store instructions; and at least one computer processor configured to execute the instructions stored in the memory. When executing the instructions, the computer system presents, using a user interface, a plurality of components for selection; receives a selection of the presented plurality of components; presents, using the user interface, a linear arrangement of the selected plurality of components, at least one pair of adjacent components being separated by a selectable boundary; receives a selection of the selectable boundary; and adjusts, in response to the selection of the selectable boundary, the relative proportion of the plurality of components.

In some embodiments the computer processor is further configured to present, using the user interface, the percentage value of each of the plurality of components in proximity to each component.

In some embodiments the plurality of components sum to one hundred percent.

In some embodiments the plurality of components sum to a total value.

In some embodiments the system further includes an apparatus for generating a mixture of physical elements reflecting the relative proportion of the plurality of components. Each physical element may be a food item and the apparatus may be a food item dispenser.

In some embodiments the computer processor is further configured to receive the plurality of components for presentation. The received plurality of components may include a label for each component.

In some embodiments the user interface is part of a mobile device.

In some embodiments the plurality of components are presented in a vertical orientation.

In yet another aspect, embodiments of the present invention relate to a non-transitory computer-readable medium comprising instructions for adjusting the proportions of components in a total. The instructions when executed by a processor, are configured to electronically present, by a computer system using a user interface, a plurality of components for selection; receive, by the computer system, a selection of the presented plurality of components; present, by the computer system using the user interface, a linear arrangement of the selected plurality of components, at least one pair of adjacent components being separated by a selectable boundary; receive, by the computer system, a selection of the selectable boundary; and adjust, by the computer system in response to the selection of the selectable boundary, the relative proportion of the plurality of components.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
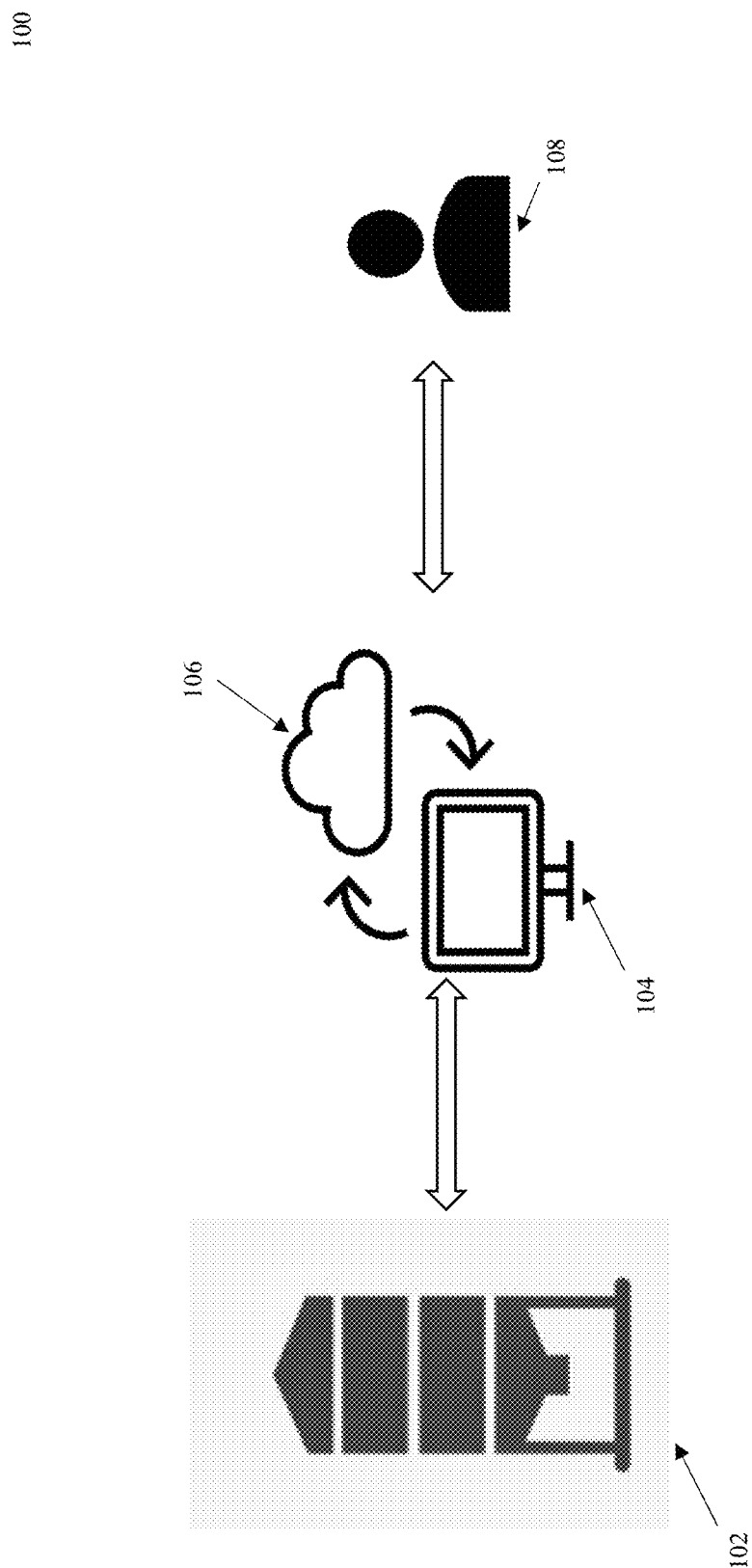
FIG. 1 illustrates a schematic block diagram of an environment for dynamically adjusting proportionality of a plurality of components in a total mixture in a grain bin, according to an embodiment of the present invention.

Skilled artisans will appreciate that elements in the drawings are illustrated for simplicity and may not have necessarily been drawn to scale. For example, the flowchart illustrates the method in terms of the most prominent steps involved to help to improve understanding of aspects of the present invention. Furthermore, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

For the purpose of promoting an understanding of the principles of the invention, reference will now be made to the various embodiments and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Therefore, it will be understood by those skilled in the art that the foregoing general description and the following detailed description are exemplary of the invention and are not intended to be restrictive thereof.

Reference throughout this specification to "an aspect," "another aspect," or similar language means that a particular feature, structure, or characteristic described in connection with the embodiment is included in at least one embodiment of the present invention. Thus, appearances of the phrase "in an embodiment," "in another embodiment," and similar language throughout this specification may, but do not necessarily, all refer to the same embodiment.

The terms "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the present invention are directed towards methods and systems for adjusting the relative proportionality of a plurality of components in real time using a user interface on a computing device. Specifically, various embodiments of the present invention describe a human machine interface designed for computing devices configured to allow users to assign approximate ratios among the plurality of components of a containerized mixture. The interface may be designed for a touch interaction paradigm, whereby users can select one or more dividing lines between pairs of the plurality of components to adjust the relative amount of each component with a dragging/sliding motion of the dividing line. In some embodiments, the ratios specify multiple components of a whole, which may or may not comprise an entire container. Proportionate ratio approximations are calculated and displayed in real time as a user conducts the dragging motion in some embodiments. The outcome of assigning a ratio to the mixture is that a mixture may be generated from the specified components in their specified proportions in some embodiments. Changing the ratio after assignment may result in the generation of a new mixture conforming with the specified components and proportions, or it may result in a hybrid mixture that is a blend of both assigned mixtures.

In an exemplary, non-limiting embodiment, the mixture may comprise grain from different fields added to a singular grain bin container. In some embodiments, the user may assign percentages as grain is put into the bin container and the ratios will be updated as grain is removed. This ratio may be updated in real time as the mixture in the grain bin container changes. In some embodiments, the assignment may occur to grain on a scale ticket. In some embodiments, the mixture assignment mechanism and ratio calculations may also apply to other solids such as, but are not limited to, salt, corn, sand, liquids, or gases.

FIG. 1 illustrates a schematic block diagram of an environment 100 for dynamically adjusting proportionality of a plurality of components in a total mixture in a grain bin, according to an embodiment of the present invention.

In an embodiment of the present invention, the environment 100 may include a storage container 102, a computing device 104, and a communication network 106. The storage container 102 may be a grain bin to store grain from one or more fields. One or more users 108 may operate a user interface (not shown in FIG. 1) on the computing device 104. Examples of suitable computing devices 104 may include, but are not limited to, a mobile phone, a laptop computer, a desktop computer, a Personal Computer (PC), a notebook, a tablet, a mobile phone, a smart watch, and e-book readers or any other smart device having capability to provide a user interface with communication network connectivity to receive user inputs.

The user interface of the computing device 104 may be configured to display a plurality of components and their associated proportions in a total mixture of the storage container 102. For example, the computing device 104 may display grains, with each grain associated with a field owned by a farmer. The user interface may be accessed through a pre-installed mobile application or a web browser on the computing device 104. In some embodiments of the present invention, the computing device 104 may be configured to provide a touch-based user interface to receive inputs from the user 108. In some other embodiments of the present invention, the computing device 104 may be configured to receive voice-based or keyboard-based inputs to modify the relative proportion of one or more components displayed on the user interface.

Further, the computing device 104 may be in communication with a server (not shown) via a communication network 106. For example, the computing device may communicate with the server over hypertext transfer protocol (HTTP) through a web service. Thus, the computing device and the server may communicate via a cellular, Ethernet, or Wi-Fi communication. In one embodiment, the computing device 104 and the server may be implemented in a client server architecture. The user interface of the computing device 104 may be accessed from a remote location via the communication network 106.

In an exemplary embodiment of the present invention, the computing device 104 may be integrated on an outer periphery or an outer wall of the storage container 102. Accordingly, in the same embodiment, the user interface of the computing device 104 may be accessible at the location of the storage container 102. In another exemplary embodiment, the computing device 104 may be located remotely from the storage container 102, and the user interface may display the components of the storage container along with their proportions in a total mixture of the storage container 102. In yet another embodiment, the storage container 102 may be implemented as an Internet of Things (IoT) device configured to provide the user interface to receive one or more user inputs to adjust the proportions of a plurality of components stored in the storage container 102.

In some embodiments, the storage container 102 may be equipped with one or more sensors and transmitter(s) to provide information associated with the weight/pressure of the components stored inside the storage container 102. Further, a communication channel (not shown) may be maintained between the storage container 102 and the computing device 104 to provide dynamic updates associated with changes in weight of the components stored in the storage container 102. For example, when grain is added to the storage container 102 from a field, the additional grain may trigger the weight sensor to measure and transmit the updated weight of the storage container 102 to the computing device 104. In response to receipt of such updated weight, the computing device 104 may be configured to automatically update the proportions of the components on the user interface of the computing device 104.

In yet another embodiment, the computing device 104 in conjunction with the storage container 102 may be equipped with a communication mechanism to generate alerts for a user to modify the proportionality of the plurality of components, when at least one of said plurality components are added or removed from the storage container 102. The alerts may be generated and transmitted by the computing device 104 in the form of SMS, email, pop-up notifications, etc. For example, the storage container 102 may be configured to trigger its own weight measurement via one or more weight sensors in response to detecting addition or removal of any grains (components). The information with respect to change in weight may be transmitted to the computing device 104, and an alert may then be provided via the computing device 104 for the user. In response to detection of the alert, the user may be prompted to modify the proportions of the plurality of components or to add a new component in the storage container 102.

Figure 2:
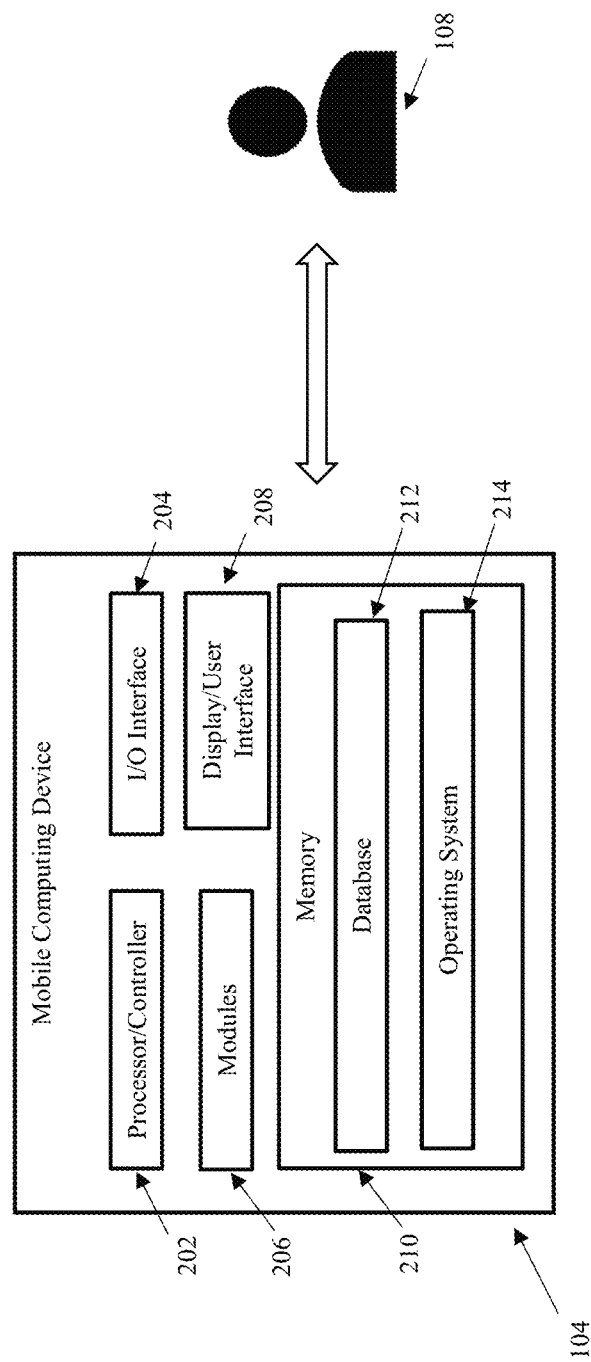
FIG. 2 illustrates a schematic block diagram of a computing device for dynamically adjusting proportionality of a plurality of components in a total via a user interface, according to an embodiment of the present invention.

FIG. 2 illustrates a schematic block diagram 200 of a computing device 104 for dynamically adjusting the proportionality of a plurality of components in a total via a user interface, according to an embodiment of the present invention. The computing device 104 may be similar to the computing device as previously depicted in FIG. 1. In one embodiment of the present invention, the computing device 104 may include a processor/controller 202, an I/O interface 204, one or more modules 206, a display/user interface 208, and a memory 210. The memory 210 may further include a database 212 and an operating system 214. For the sake of brevity, the architecture and standard operations of operating system 214, memory 210, database 212, processor/controller 202, display/user interface 208, and I/O interface 204 are not discussed here in detail.

In some embodiments, the memory 210 may be communicatively coupled to the at least one processor/controller 202. The memory 210 may be configured to store data and instructions executable by the at least one processor/controller 202. In some embodiments, the one or more modules 206 may be included within the memory 210. The memory may further include a database 212 to store data.

The one or more modules 206 may include a set of instructions that may be executed to cause the computing device 104 to perform in accord with any one or more of the embodiments disclosed herein. The one or more modules 206 may be configured to perform the steps of the present invention using the data and instructions stored in the database 212 to provide a user interface for dynamically adjusting proportions of various components as discussed herein throughout this disclosure.

In one embodiment of the present invention, the one or more modules 206 may be a part of an installed software application on the computing device 104, which may be configured to provide the user interface to modify the proportionality of a plurality of components. In one embodiment of the present invention, each of the one or more modules 206 may be a hardware unit which may be located outside the memory 210. Further, the memory 210 may include an operating system 214 for performing one or more tasks of the computing device 104, as performed by a generic operating system in the communications domain.

The display/user interface 208 may be configured to provide a touch-based display interface to provide information regarding plurality of components, such as those stored in a storage container 102, and to receive user inputs to modify the proportions of such components. Further, the display/user interface 208 may provide a display function and one or more physical buttons on the computing device 104 to operate various functions of the computing device 104. The I/O interface 204 may include a transceiver which is capable of receiving and transmitting signals as well as receiving touch/keyboard/mouse-based inputs to and from the computing device 104. Further, the I/O interface 204 may include a speaker and/or a microphone to receive voice commands and provide a voice output to the user 108.

In one embodiment, the database 212 may be configured to store the information as required by the one or more modules 206 and processor/controller 202 to perform one or more functions to dynamically adjust the proportions of various components stored in the storage container 102.

In one embodiment, the memory 210 may communicate via a bus within the computing device 104. The memory 210 may include, but is not limited to, a non-transitory computer-readable storage media, such as various types of volatile and non-volatile storage media including, but are not limited to, random access memory, read-only memory, programmable read-only memory, electrically programmable read-only memory, electrically erasable read-only memory, flash memory, magnetic tape or disk, optical media and the like. In one example, the memory 210 may include a cache or random-access memory for the processor/controller 202. In alternative examples, the memory 210 is separate from the processor/controller 202, such as a cache memory of a processor, the system memory, or other memory. The memory 210 may be an external storage device or database for storing data. The memory 210 may be operable to store instructions executable by the processor/controller 202. The functions, acts or tasks illustrated in the figures or described may be performed by the programmed processor/controller 202 for executing the instructions stored in the memory 210. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

Further, the present invention contemplates a computer-readable medium that includes instructions or receives and executes instructions responsive to a propagated signal, so that the computing device 104 connected to a network may communicate voice, video, audio, images, or any other data over a network. Further, the instructions may be transmitted or received over the network via a communication port or interface or using a bus (not shown). The communication port or interface may be a part of the processor/controller 202 or may be a separate component. The communication port may be created in software or may be a physical connection in hardware. The communication port may be configured to connect with a network, external media, the display, or any other components in system, or combinations thereof. The connection with the network may be a physical connection, such as a wired Ethernet connection or may be established wirelessly. Likewise, the additional connections with other components of the computing device 104 may be physical or may be established wirelessly. The network may alternatively be directly connected to the bus.

In one embodiment, the processor/controller 202 may include at least one data processor for executing processes in Virtual Storage Area Network. The processor/controller 202 may include specialized processing units such as, integrated system (bus) controllers, memory management control units, floating point units, graphics processing units, digital signal processing units, etc. In one embodiment, the processor/controller 202 may include a central processing unit (CPU), a graphics processing unit (GPU), or both. The processor/controller 202 may be one or more general processors, digital signal processors, application-specific integrated circuits, field-programmable gate arrays, servers, networks, digital circuits, analog circuits, combinations thereof, or other now known or later developed devices for analyzing and processing data. The processor/controller 202 may implement a software program, such as code generated manually (i.e., programmed).

The processor/controller 202 may be disposed in communication with one or more input/output (I/O) devices via the I/O interface 204. The I/O interface 204 may employ communication code-division multiple access (CDMA), high-speed packet access (HSPA+), global system for mobile communications (GSM), long-term evolution (LTE), WiMax, or the like, etc.

Using the I/O interface 204, the computing device 104 may communicate with one or more I/O devices. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

The processor/controller 202 may be disposed in communication with a communication network via a network interface. The network interface may be the I/O interface 204. The network interface may connect to a communication network. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the computing device 104 may communicate with other devices. The network interface may employ connection protocols including, but are not limited to, direct connect, Ethernet (e.g., twisted pair 10/100/1000 Base T), transmission control protocol/internet protocol (TCP/IP), token ring, IEEE 802.11a/b/g/n/x, etc.

Figure 3:
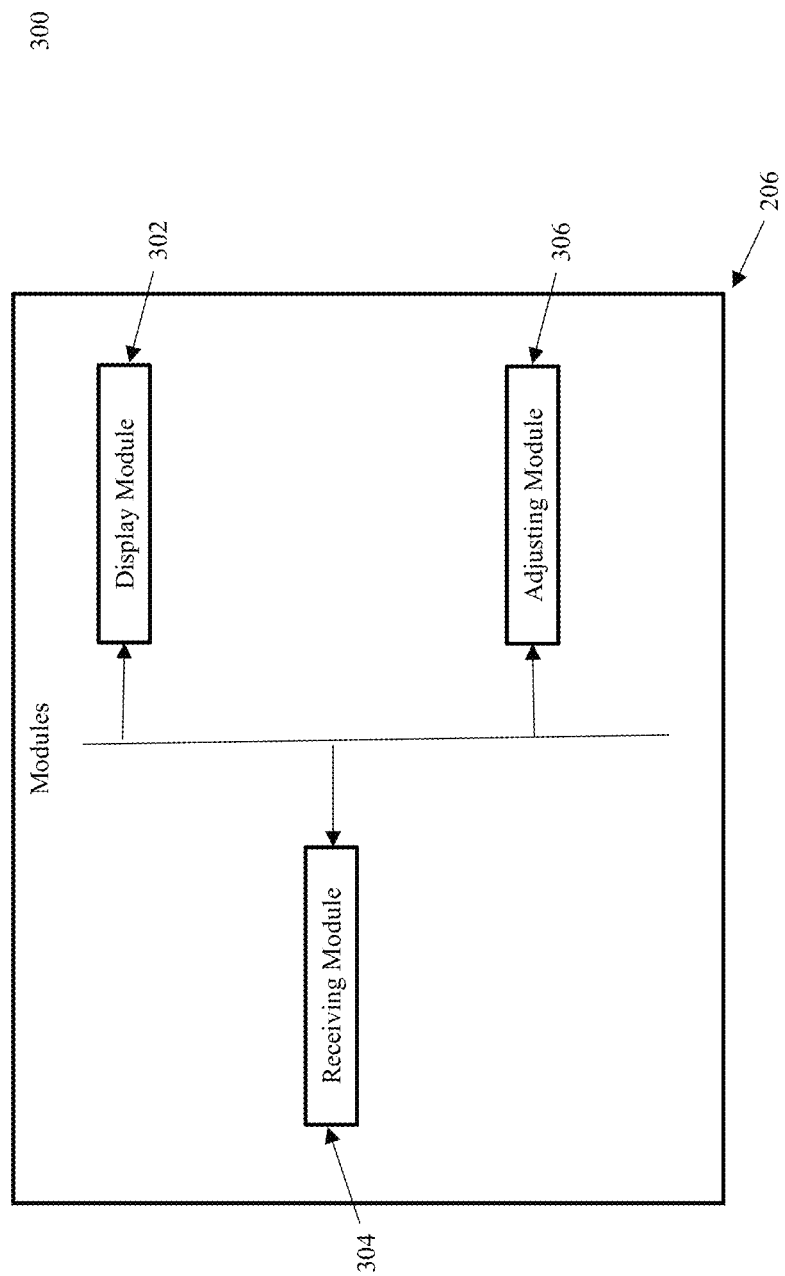
FIG. 3 illustrates a schematic block diagram of modules of the computing device of FIG. 2 for dynamically adjusting proportionality of a plurality of components in a total via a user interface, according to an embodiment of the present invention.

FIG. 3 illustrates a schematic block diagram of modules 206 of the computing device 104 for dynamically adjusting the proportionality of a plurality of components in a total via a user interface, according to an embodiment of the present invention. In one embodiment of the present invention, the modules 206 may include a display module 302, a receiving module 304, and an adjustment module 306.

In one embodiment, the display module 302 may be configured to present, using the user/display interface of the computing device, a plurality of components for selection by the user. The plurality of components may correspond to grains associated with a plurality of fields owned by one or more farmers. For example, a component A may be associated with a first field, component B may be associated with a second field, and the like. In some embodiments, a user may first dynamically add named components at a first user interface. Then, from this interface, the user may be directed to a primary screen where the user may select previously named components. In one embodiment, a selection element may be included against each of the plurality of components for selecting the corresponding component. Examples of selection elements may include, but are not limited to, check boxes, drag and drop selection, and highlighting.

In one embodiment of the present invention, the receiving module 304 may be configured to receive a selection of the presented plurality of components. When a user selects multiple components, the display module 302 may proportionally place each component representation on the screen in a linear arrangement in a horizontal or vertical manner. Further, each pair of two adjacent components may be separated by a selectable boundary or a dividing line. In some embodiments, the components may be adjusted using a slider bar, a button, and other such input regions displayed on the user interface. In some embodiments, this component representation may be colored or patterned to distinguish between components. Various embodiments of these user interface screens are illustrated in detail in conjunction with FIGS. 4A, 5A, and 6A below.

In some embodiments, once the initial representation is rendered, the receiving module 304 may be configured to receive a user selection to move the dividing lines or selectable boundaries between an adjacent pair of components.

In one embodiment, the adjusting module 306 may be configured to adjust/update, in response to the selection of the selectable boundaries, the relative proportion or the ratios of the plurality of components automatically after the operator completes their interaction with the user interface. Various embodiments of these updated user interface screens are illustrated in detail in conjunction with FIGS. 4B, 5B, and 6B below. After assigning/adjusting the ratios of the components, the ratios can then be applied to outputs from the storage container. For example, if the mixture is grain contained within a bin/storage container, and the components are fields where the grain came from, then the application of the assigned ratios could be applied to a scale ticket. Scale tickets represent receipt of delivery at a destination such as a grain elevator.

Figure 4B:
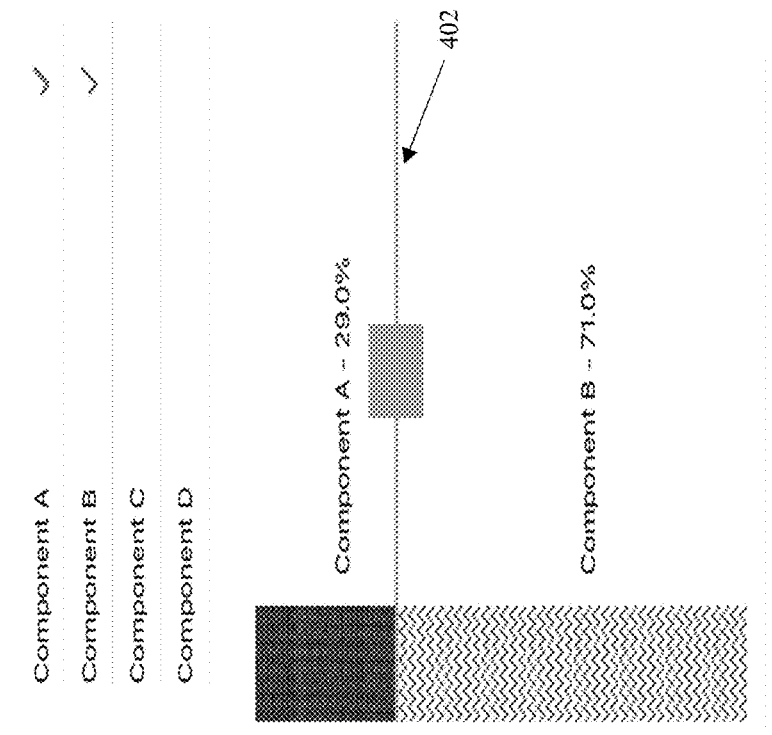
FIG. 4B illustrates the user interface of FIG. 4A after adjustment of the proportionality of the components according to an embodiment of the present invention.
Figure 4A:
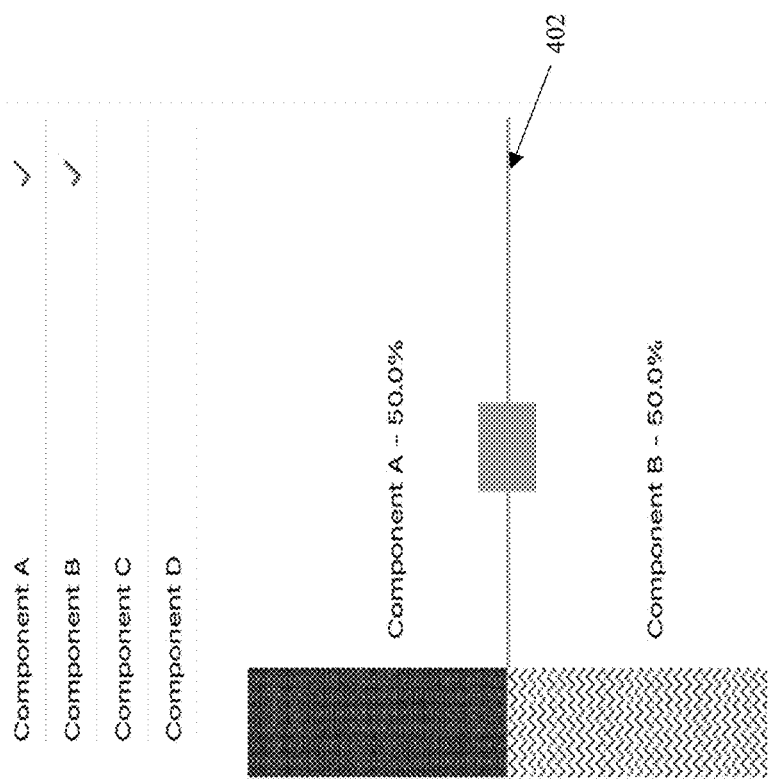
FIG. 4A illustrates a user interface depicting the proportionality of two components in a total mixture according to an embodiment of the present invention.

FIGS. 4A & 4B illustrate a user interface for interacting with a composite having four individual components: A, B, C & D. The checkmarks next to components A & B indicate that a user has selected them to view their initial composition relative to each other, and perhaps to adjust that relative composition. The absence of checkmarks from components C & D indicate that the user is not interested in adjusting them at this time.

One of ordinary skill will understand that each of the four components will necessarily have some presence in the total composite, otherwise the component having no presence in the total would be omitted from the list. For example, the total may consist of 25% component A, 25% component B, 25% component C, and 25% component D.

FIG. 4A illustrates a user interface depicting the proportionality of two components in the composite in a first state, according to an embodiment of the present invention. Since A & B have been selected, and A & B, in this example, each represent 25% of the composite, the user interface depicts them as being in equal proportion relative to each other, i.e., 50% component A and 50% component B.

FIG. 4B illustrates an updated user interface depicting an adjusted proportionality of two components in the composite, according to an embodiment of the present invention. In this embodiment, the user adjusted the ratio of two components A and B by selecting the dividing line (boundary separator) 402. As shown in FIG. 4A, the two components A and B were rendered on the user interface in equal proportions initially. By dragging the dividing line 402 between the two components in the direction of component A, the ratio of component B to component A was adjusted to make component B a larger component of the composite, while automatically adjusting the total to maintain one hundred percent proportionality representing the whole of the mixture of the selected components (i.e., selected components A & B, which may be less than 100% of the total composite which also includes components C & D).

Figure 5B:
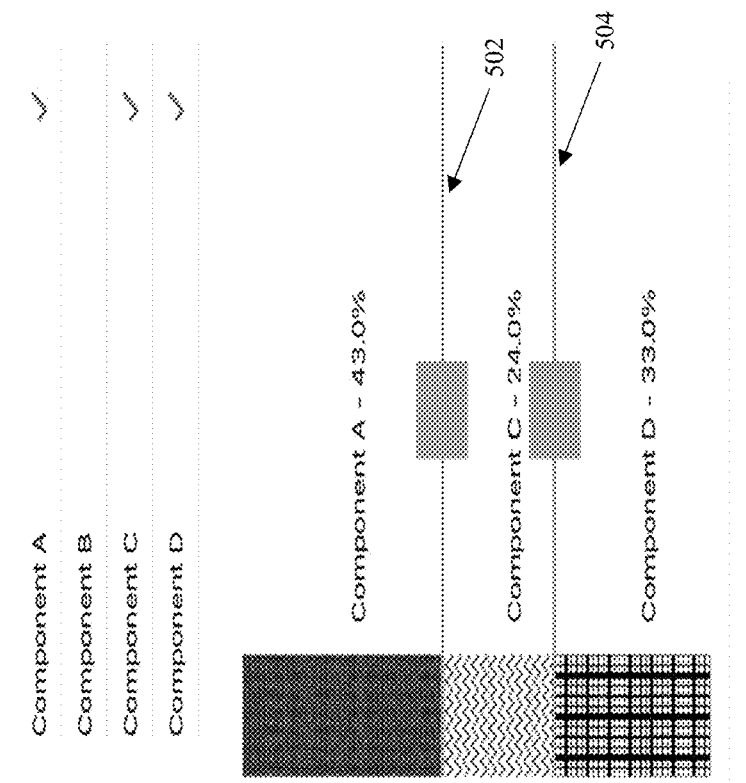
FIG. 5B illustrates the user interface of FIG. 5A after adjustment of the proportionality of the components according to an embodiment of the present invention.
Figure 5A:
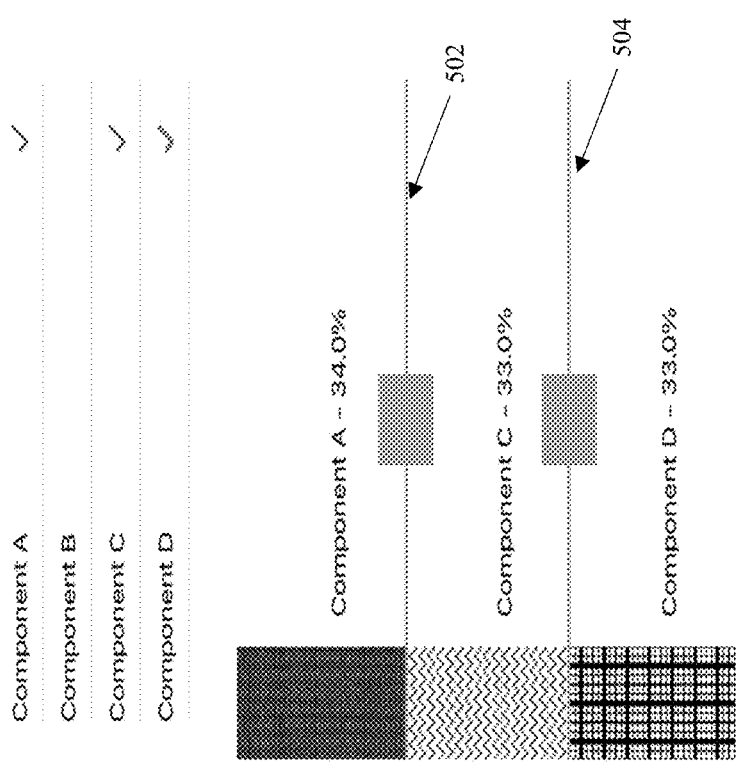
FIG. 5A illustrates a user interface depicting the proportionality of three components in a total mixture according to an embodiment of the present invention.

FIG. 5A illustrates a user interface depicting the proportionality of three components in the composite in a first state, according to an embodiment of the present invention. Since A, C & D have been selected, and A, C & D, in this example, each represent 25% of the composite, the user interface depicts them as being in equal proportion (after rounding) relative to each other, i.e., 33% component A, 33% component C, and 33% component D.

FIG. 5B illustrates an updated user interface depicting an adjusted proportionality of three components in the composite, according to an embodiment of the present invention. In this embodiment, the user adjusted the ratios of three components A, C, and D by selecting the dividing line (boundary separator) 502. As shown in FIG. 5A, the two components A and C were rendered on the user interface as substantially equal initially. Then by dragging the dividing line 502 between the two components in the direction of component A, the ratio of component C to component A was adjusted to make component C a larger component of the composite, while leaving the amount of component D unchanged. Again, the total is automatically adjusted to maintain one hundred percent proportionality representing the whole of the mixture of the selected components (i.e., selected components A, C & D, which may be less than 100% of the total composite which also includes components B). The user may similarly elect to change the ratio of component D to component C by selecting and dragging dividing line 504.

When each component is representative of, e.g., grain from a particular source or field, then after assigning ratios to the components, the ratios can then be applied to outputs from the storage container by way of, e.g., a scale ticket. Scale tickets represent receipt of delivery at a destination such as a grain elevator. In the example shown in FIG. 5B, the user has set the composition of the composite as 43%, 24%, and 33%. Each of those components is representative of grain from a different field. As grain is removed from the bin, loaded into trucks, and subsequently delivered to an elevator, a scale ticket is generated. Applying these percentages to an 800 BU load of grain would result in attributing 344 BU to Field A, 192 BU to Field C and 264 BU to Field D.

Figure 6B:
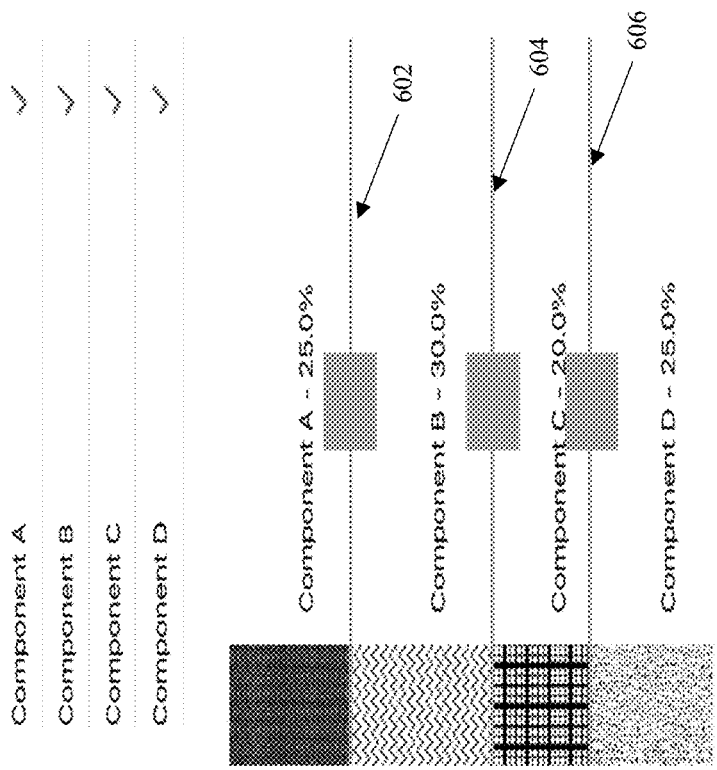
FIG. 6B illustrates the user interface of FIG. 6A after adjustment of the proportionality of the components according to an embodiment of the present invention.
Figure 6A:
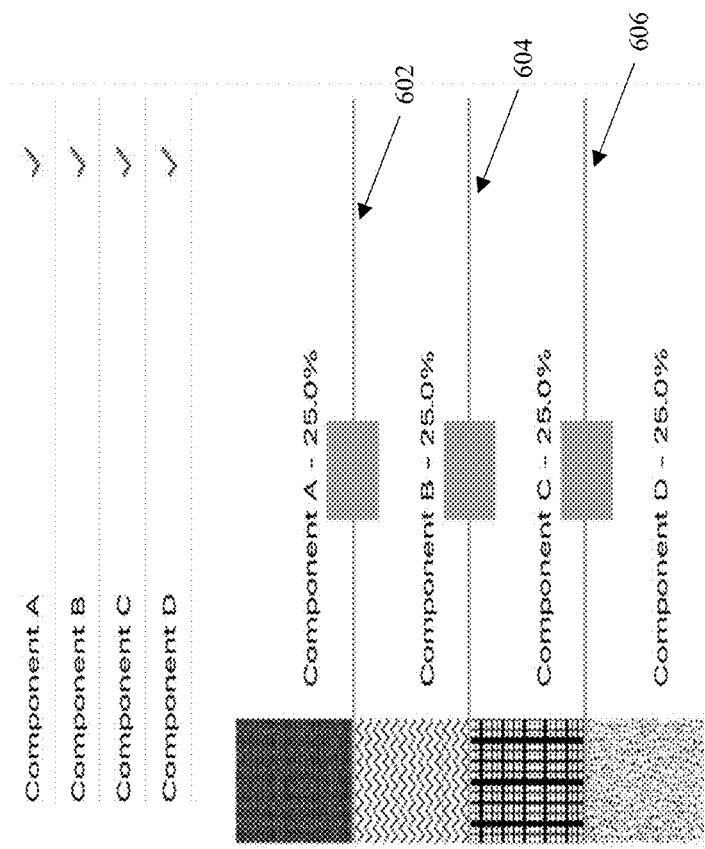
FIG. 6A illustrates a user interface depicting the proportionality of four components in a total mixture according to an embodiment of the present invention.

FIG. 6A illustrates a user interface depicting the proportionality of four components in the composite in a first state, according to an embodiment of the present invention. Continuing the earlier example, all four components have been selected and each component represents 25% of the composite, therefore the user interface depicts them as being in equal proportion relative to each other.

FIG. 6B illustrates an updated user interface depicting an adjusted proportionality of four components in the composite, according to an embodiment of the present invention. In this embodiment, the user adjusted the ratio of two components B and C by selecting the dividing line (boundary separator) 604. As shown in FIG. 6A, the two components B and C were rendered on the user interface in equal proportions initially. By dragging the dividing line 604 between the two components in the direction of component C, the ratio of component B to component C was adjusted to make component B a larger component of the composite, while automatically adjusting the total to maintain one hundred percent proportionality representing the whole of the mixture of the selected components. The user may similarly elect to change the ratio of component A to component B by selecting and dragging dividing line 602, or the ratio of component C to component D by selecting dividing line 606.

Figure 7:
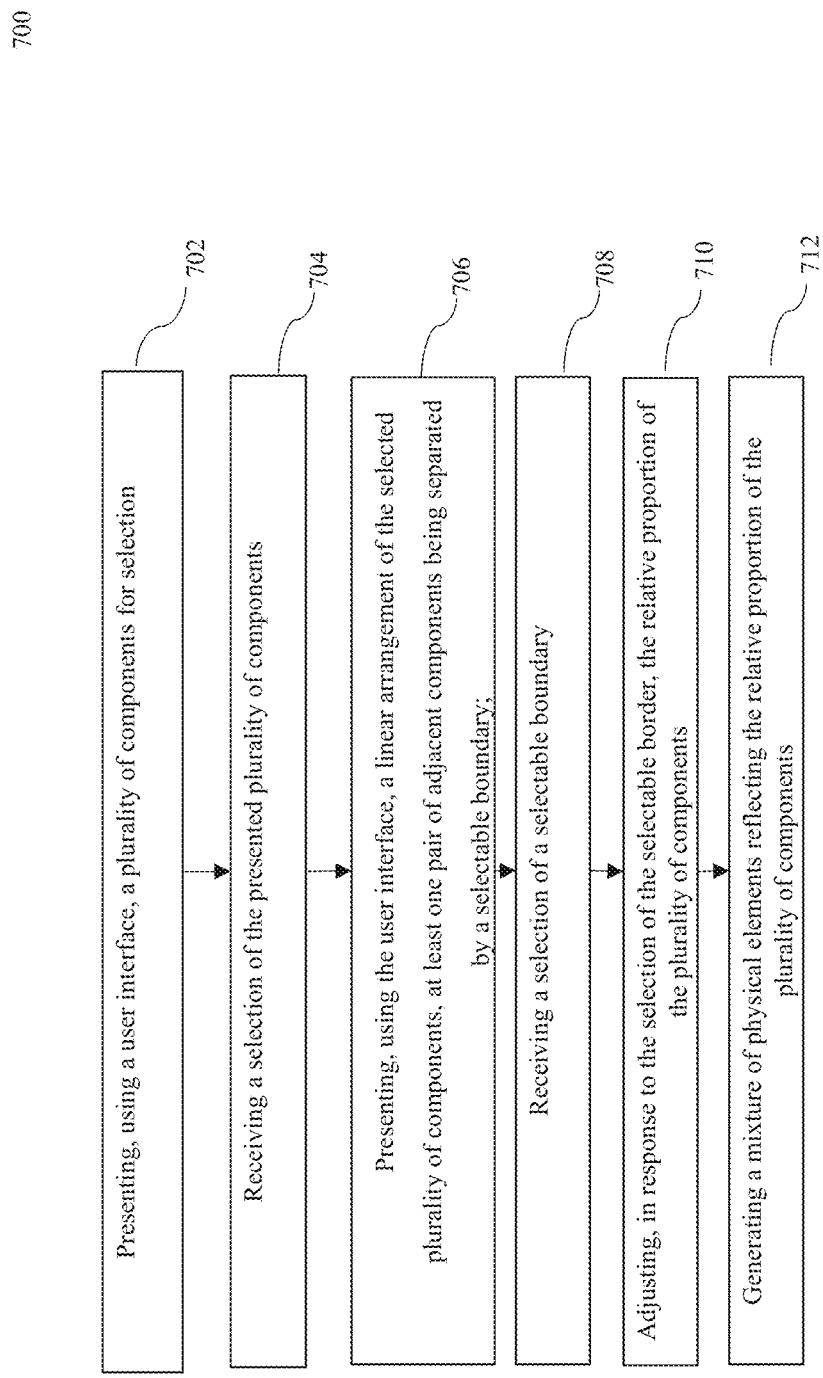
FIG. 7 is a flowchart of an exemplary method for adjusting the proportions of components in a total mixture according to an embodiment of the present invention.

FIG. 7 is a flowchart depicting a method 700 for adjusting the proportions of components in a total mixture, according to an embodiment of the present invention. In one embodiment, the steps of the method 700 may be performed by a computing device like the computing device 104.

At step 702, the method includes presenting, using a user interface, a plurality of components for selection. For example, the computing device 104 may display components of grains associated with a plurality of fields owned by a farmer. In some embodiments, prior to presenting the plurality of components, the method may include receiving the plurality of components for presentation. Additionally, the received plurality of components may include a label for each component.

At step 704, the method includes receiving a selection of the presented plurality of components. As discussed above, a user may first add named components at a first user interface. Then, from this interface, the user may be directed to an interface where the user may select one or more previously named components.

At step 706, the method includes presenting, using the user interface, a linear arrangement of the selected plurality of components, at least one pair of adjacent components being separated by a selectable boundary. When a user selects multiple components, each component representation may be proportionally placed on the screen in a linear arrangement in a horizontal or vertical orientation. Further, each pair of two adjacent components may be separated by a selectable boundary or a dividing line. In some embodiments, this component representation may be colored or patterned to distinguish between components. In some further embodiments, the method at step 706 may further include presenting, using the user interface, the percentage value of each of the plurality of components in proximity to each component. Further, the plurality of components may sum to one hundred percent or a total value.

At step 708, the method includes receiving a selection of a selectable boundary. A user selection may be received to move the dividing lines or selectable boundaries between pairs of adjacent components.

At step 710, the method includes adjusting, in response to the selection of the selectable border, the relative proportion of the components. After assigning/adjusting ratios of the mixture, the ratios can then be applied to, e.g., outputs from a storage container. For example, if the mixture is grain contained within a bin, and the components are fields where the grain came from, then the application of the assigned ratios could be applied to a scale ticket. Scale tickets represent receipt of delivery at a destination such as a grain elevator. In other embodiments, adjusting the relative proportion of components may be used to decide how much each diner pays on a check for a meal, or for recording the composition of a mixture, the mutual funds in an investment account, etc.

At step 712, the method may include generating a mixture of physical elements reflecting the relative proportion of the plurality of components. In one embodiment, each physical element may be a food item, for example, grain.

While the above discussed steps in FIG. 7 are shown and described in a particular sequence, the steps may occur in variations to the sequence in accordance with various embodiments.

By presenting a farmer with an intuitive interface which allows them to approximate and assign how much grain is placed into a bin, and from which field, embodiments enable components of tracking and traceability and increase the likelihood that a farmer may record this information. The interface provides a mechanism for inputting field names and bins in some embodiments. When this information has been entered, the user may be presented with a multitude of dynamically generated selection points indicating the level of grain per field within the bin. When interacting with the selection points by dragging them vertically, calculations may be automatically adjusted to maintain proportionally allocated ratios of grain to field.

When compared to other methods of recording amounts, the interface provides a visual representation and mechanism for interaction that may be more convenient and easier to use in some embodiments. The manual method of tick marking per truck may still be used with some interface embodiments. In some embodiments, the method of entry being mobile and user friendly would simplify the action of recording this information.

One of ordinary skill would recognize that the scope of the invention is not limited to agricultural applications. In one aspect, embodiments of the invention relate to an improved user interface for adjusting the relative proportion of components in a total mixture. Many applications, agricultural and non-agricultural, are suited for use with such embodiments, which are suitable for implementation in a variety of computing environments.

For example, diners looking to split a meal check could use an embodiment of the interface to determine the amount to be paid by each diner. An employee inventorying the contents of a storeroom could use an embodiment of the interface to make a record of the relative amount of each item in the storeroom. Many other applications are apparent to one of ordinary skill in the art.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method for adjusting the proportions of components in a total, the method comprising:
   providing a computer processor configured to:
   present, using a user interface, a plurality of components for selection, wherein the plurality of components comprise grain;
   receive a selection of the presented plurality of components;
   present, using the user interface, a linear arrangement of a ratio of the selected plurality of components, wherein a first component of the plurality of components and a second component of the plurality of components are separated by a selectable boundary;
   receive a selection of the selectable boundary;
   receive input indicating movement of the selectable boundary toward the first component of the plurality of components;
   adjust the relative proportion of the plurality of components by reducing the relative proportion of the first component by an amount proportional to the amount of movement of the selectable boundary toward the first component; and
   generate, autonomously, a physical mixture of the plurality of components based on the adjusted relative proportion of the plurality of components and present an updated ratio of the plurality of components in real time as the physical mixture is being generated.

2. The method of claim 1 wherein the computer processor is further configured to present, using the user interface, the percentage value of each of the plurality of components in proximity to each component.

3. The method of claim 1 wherein the plurality of components sum to one hundred percent.

4. The method of claim 1 wherein the plurality of components sum to a total value.

5. The method of claim 1 wherein the computer processor is further configured to receive the plurality of components for presentation.

6. The method of claim 5 wherein the received plurality of components includes a label for each component.

7. The method of claim 1 wherein the user interface is part of a mobile device.

8. The method of claim 1 wherein the plurality of components are presented in a vertical orientation.

9. A computer system for adjusting the proportions of components in a total, the system comprising:
   a memory configured to store instructions; and
   at least one computer processor configured to execute the instructions stored in the memory to:
   present, using a user interface, a plurality of components for selection, wherein the plurality of components comprise grain;
   receive a selection of the presented plurality of components;
   present, using the user interface, a linear arrangement of a ratio of the selected plurality of components, wherein a first component of the plurality of components and a second component of the plurality of components are separated by a selectable boundary;
   receive a selection of the selectable boundary;
   receive input indicating movement of the selectable boundary toward the first component of the plurality of components;
   adjust the relative proportion of the plurality of components by reducing the relative proportion of the first component by an amount proportional to the amount of movement of the selectable boundary toward the first component; and
   generate, autonomously, a physical mixture of the plurality of components based on the adjusted relative proportion of the plurality of components and present an updated ratio of the plurality of components in real time as the physical mixture is being generated.

10. The system of claim 9 wherein the computer processor is further configured to present, using the user interface, the percentage value of each of the plurality of components in proximity to each component.

11. The system of claim 9 wherein the plurality of components sum to one hundred percent.

12. The system of claim 9 wherein the plurality of components sum to a total value.

13. The system of claim 9 wherein the computer processor is further configured to receive the plurality of components for presentation.

14. The system of claim 13 wherein the received plurality of components includes a label for each component.

15. The system of claim 9 wherein the user interface is part of a mobile device.

16. The system of claim 9 wherein the plurality of components are presented in a vertical orientation.

17. A non-transitory computer-readable medium comprising instructions for adjusting the proportions of components in a total that, when executed by a processor, are configured to:
   electronically present, by a computer system using a user interface, a plurality of components for selection, wherein the plurality of components comprise grain;
   receive, by the computer system, a selection of the presented plurality of components;
   present, by the computer system using the user interface, a linear arrangement of a ratio of the selected plurality of components, wherein a first component of the plurality of components and a second component of the plurality of components are separated by a selectable boundary;
   receive, by the computer system, a selection of the selectable boundary;
   receive input indicating movement of the selectable boundary toward the first component of the plurality of components;
   adjust, by the computer system, the relative proportion of the plurality of components by reducing the relative proportion of the first component by an amount proportional to the amount of movement of the selectable boundary toward the first component; and generate, autonomously, a physical mixture of the plurality of components based on the adjusted relative proportion of the plurality of components and present an updated ratio of the plurality of components in real time as the physical mixture is being generated.

* * * * *